Jan. 30, 1945.   J. M. TYLER   2,368,334
ENGINE SUSPENSION SYSTEM
Filed March 27, 1943   2 Sheets-Sheet 1

INVENTOR
John M. Tyler
BY Charles L. Shelton
ATTORNEY.

Jan. 30, 1945.   J. M. TYLER   2,368,334
ENGINE SUSPENSION SYSTEM
Filed March 27, 1943   2 Sheets-Sheet 2

INVENTOR
John M. Tyler
BY Charles L. Shelton
ATTORNEY.

Patented Jan. 30, 1945

2,368,334

UNITED STATES PATENT OFFICE 2,368,334

ENGINE SUSPENSION SYSTEM

John M. Tyler, West Hartford, Conn., assignor to United Aircraft Corporation, East Hartford, Conn., a corporation of Delaware Application March 27, 1943, Serial No. 480,813

7 Claims. (Cl. 248—5)

This application is a continuation in part of my co-pending United States application, Serial No. 384,544, filed March 21, 1941.

This invention relates to improvements in suspension means for vehicle power plants and has particular reference to an improved mounting for suspending an aircraft engine from an engine supporting ring.

An object of the invention resides in the provision of an improved aircraft power plant suspension which is effective to suppress the transmission of certain vibrational forces from the power plant to the aircraft.

A further object resides in the provision of an improved power plant suspension of the character indicated including resilient bodies acting in both shear and compression and arranged to provide a softer connection when acting in shear than when acting in compression and in which the angular relation of the resilient bodies to the node in the engine of a particular mode of power plant vibration is such that substantially all of the forces produced by this particular mode of vibration of the power plant are resisted by the resilient bodies acting in shear only.

A still further object of the invention is the provision of an improved power plant suspension of the character indicated, including resilient suspension units acting in both shear and compression, in which the axis of minimum rotational stiffness for movements of the power plant corresponding to a particular mode of power plant vibration passes substantially through the node, and in which the point of intersection of the axes of major stiffness of said suspension units with the axis of rotation of the power plant varies with respect to the node with variations in the ratio of compression to shear of the units.

Other objects and advantages will be more particularly pointed out hereinafter or will become apparent as the description proceeds.

In the accompanying drawings, in which like reference numerals are used to designate similar parts throughout, there are illustrated two suitable mechanical embodiments for the purpose of disclosing the invention. The drawings, however, are for the purpose of illustration only and are not to be taken as limiting or restricting the invention since it will be apparent to those skilled in the art that various changes in the illustrated embodiments may be resorted to without in any way exceeding the scope of the invention.

In the drawings, Fig. 1 is a somewhat diagrammatic view of an aircraft power plant and support therefor showing the application thereto of a suspension unit constructed and arranged according to the invention and diagrammatically illustrating the character of a particular mode of vibration.

Figure 1:
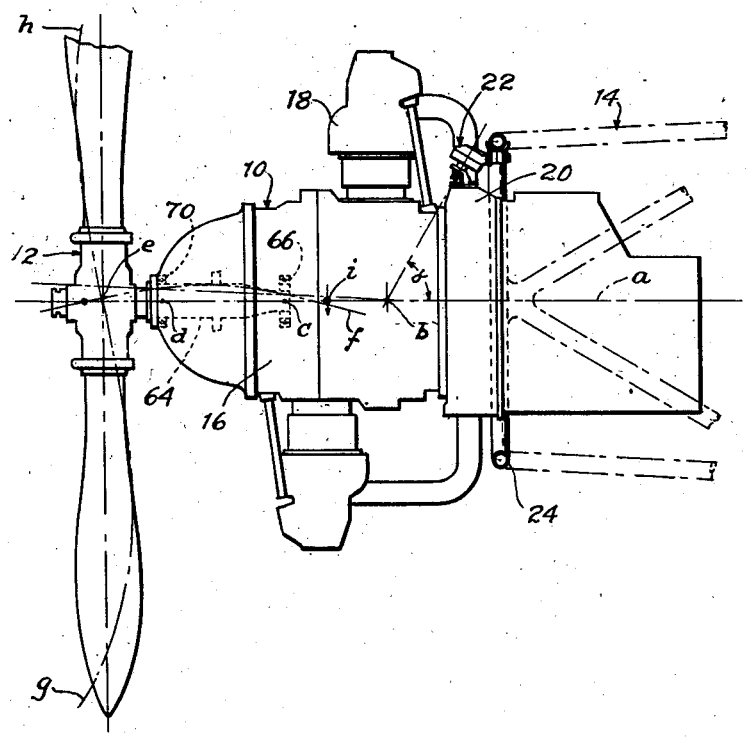

Referring to the drawings in detail, Fig. 1 schematically shows a typical aircraft power plant arrangement including an engine generally indicated at 10, a propeller generally indicated at 12, and a power plant support generally indicated at 14. The engine illustrated is an air-cooled radial type of engine conventionally employed for the propulsion of aircraft but it is to be understood that the invention is not restricted to any particular type of engine, the radial air-cooled type being shown merely for convenience in the illustration. This engine has a generally cylindrical crankcase 16 carrying a plurality of radially disposed cylinders 18 and has angularly spaced around a portion thereof a plurality of attachment points or pads, as indicated at 20, for the engine suspension brackets, one of which is generally indicated at 22, which connect the engine crankcase to the engine mount ring 24. While only one suspension unit or bracket 22 has been illustrated, it is to be understood that a plurality of such units would be used angularly spaced around the engine and the ring 24 in a manner calculated to best support the engine on the mounting structure.

The suspension unit may be of the general character particularly shown and described in my United States Patent No. 2,317,500, issued April 27, 1943, for Flexible supports, and may include a pedestal element 26 secured to the engine pad 20 by suitable means, such as the cap screws 28 supporting a core member 30 having a flattened head portion 32 received within a hollow housing 34 secured to an apertured lug 36 attached to the mounting ring 24 opposite the corresponding engine pad 20 by suitable means, such as brazing or welding. The housing 34 is made of two separable parts secured together by suitable means, such as the cap screws 38, and is attached to the lug 36 by means of an integral stem 40 and a nut 42 screw threaded onto the end of the stem opposite the housing and clamping the lug between the housing and the nut. The core member 30 is secured to the pedestal 26 by means of a stem 44 extending through a portion of the pedestal, and a nut 46 screw threaded on the end of the stem and clamping the portion of the pedestal through which the stem extends between the nut and a shoulder 48 formed on the core member. The flattened head 32 of the core member 30 is maintained in operative position in the housing 34 by means of bodies 50 and 52 of flexible material, such as rubber, bonded respectively to the opposite surfaces of the head 32 and bearing against the end walls of the housing. Each of these bodies is provided with thin metal reinforcements, as indicated at 54 for the body 50 and 56 for the body 52, to control the ratio of the stiffness of the bodies in shear and in compression. The body 50 is provided with an end plate 58 bonded thereto and received in a depression in the upper end wall of the housing to center this body with respect to the housing while the body 52 is provided with an apertured end plate 60 which fits the lower end of the housing and centers the body 52 in operative position. The body 52 is provided with a central aperture of sufficient diameter to provide an annular space 62 around the portion of the core 30 which extends therethrough in order that the core may have a lateral freedom of movement with respect to the housing in all directions, as well as an endwise freedom of movement, restricted only by the resistance of the resilient material in shear and compression respectively.

With this arrangement, all of the forces between the power plant and the power plant support are transmitted entirely through the resilient material in the various suspension units, those forces acting in planes parallel to the surfaces of the flat resilient pads being transmitted through shear in the resilient material while the forces acting along the longitudinal center lines of the core members are transmitted through compression of the resilient material.

There are various modes of vibration involving the power plant in some of which (1) the engine and propeller vibrate together as a single unit and in others of which (2) the engine and propeller vibrate relative to each other. Most of the prior art suspension devices of which I am aware and the device of my United States Patent No. 2,317,500, referred to above, are particularly designed to provide an optimum suspension from the standpoint of vibrations involving only the first mentioned modes of vibration between the power plant and its support. With this object in view they are so designed that the lines perpendicular to the surfaces of the flat resilient pads (or the axes of compression) intersect the rotational axis of the engine at a point farther from the mounting plane than the center of gravity of the power plant.

This location for the intersection was chosen to produce a geometry of the flexible suspension units relative to the power plane mass such as to bring the natural frequencies of vibration of the power plant with respect to its support in certain modes of vibration of the power plant into a specified frequency band below the frequency of the lowest orders of excitation at the lowest operating speed of the engine.

The present invention relates to an optimum suspension from the standpoint of vibrations involving only the second mentioned mode of vibration, or vibrations of the engine and propeller relative to each other, and involves a geometry of the flexible suspension units relative to the power plant mass such as to provide a minimum transmission of forces incident to these second mentioned modes of vibration to the aircraft structure. These last mentioned modes of vibration, commonly called engine-propeller "whirls" or "wobble" are relatively independent of the characteristics of the power plant suspension and cannot, therefore, be substantially reduced or retarded by improving the suspension system so that improvements in the suspension system to counteract their effect must, in general, be directed toward insulating the power plant from the aircraft with respect to the vibrational forces incident to these "whirl" or "wobble" modes of vibration.

In these particular modes of vibration the masses involved are the engine mass, the propeller hub mass and the distributed mass of the propeller blades, and the flexible elements are the propeller shaft and the propeller blades.

The manner in which the vibration in the whirling or wobbling modes takes place is graphically shown in Fig. 1. The line $a$ indicates the center line or axis of rotation of the engine. As the engine whirls or wobbles this line travels about the surface of a cone the apex of which is at the nodal point $b$. As the axis $a$ circumscribes the conical surface referred to, the propeller shaft 64 and its supporting bearings 66 and 70 move in this same general manner. The propeller does not follow this coning movement of the engine axis and this causes a displacement of the three points $c$, $d$, and $e$ on the axis of the propeller shaft from a straight line condition, causing the propeller shaft to bend as indicated by the curved line $f$. The point $c$ is located at or near the center of the rear bearing 66, the point $d$ at or near the center of the front bearing 70 and the point $e$ within the propeller hub. This bending of the shaft 64 causes the propeller disc to tilt which imposes stresses on the propeller blades causing them to bend in the manner indicated by the curved lines $g$ and $h$. There is thus established a relative movement of the propeller with respect to the engine and consequent bending of the propeller shaft and propeller blades. Since the engine and the propeller do not move together the nodal point $b$ for the engine movements will be displaced from the center of gravity $i$ of the power plant and will be on the remote side of the power plant center of gravity $i$ from the propeller. There are several modes of engine-propeller whirl encountered in the operating speed ranges of present engine-propeller combinations. The first mode, which is the mode with the lowest natural frequency, has two nodes, one near the center of gravity of the engine and the other near the center of gravity of the propeller. In this mode the engine appears to wobble about its node and the propeller wobbles about its node but in an out of phase relation to the movements of the engine so that, for example, when the upper part of the engine tilts forwardly the upper part of the propeller tilts rearwardly. This mode of vibration occurs at a much higher frequency than the frequencies of the modes in which both the engine and the propeller move together. The second mode, which is the mode graphically indicated in Fig. 1, would have three nodes, two located approximately the same as in the first mode plus another in the propeller blades. This last mentioned node can be considered as being a circle in the propeller disc since it exists in each blade at the same radius. The third mode would have the first two nodes approximately as in the second mode but would have two nodes or nodal circles in the propeller blades. The fourth mode would have three nodal circles, etc. It will be noted that the node in the engine is at approximately the same point for each of these modes of vibration. This point is indicated at $b$ in Fig. 1 of the accompanying drawings.

Having recognized that modes of engine-propeller vibrations exist having a nodal point within the engine, indicated in the drawings at $b$, it is necessary, in order that the transmission of vibrations to the power plant support due to these engine-propeller modes may be kept at a minimum, to maintain the axis of minimum rotational stiffness for the combined engine-propeller combination at this nodal point.

The location of the nodal point $b$ is not altered by changes in engine suspension, its location being wholly a function of the vibration characteristics of the engine-propeller combination, as has been explained at length herein. The location of the nodal point $b$ for any particular engine-propeller combination can accordingly be determined by test. However, the location of the axis of minimum rotational stiffness is altered by variations in numerous factors relative to the engine suspension units.

In the installation shown in Fig. 1, for suspension units having very large stiffness in compression relative to shear, the axes of compression of the units intersect substantially at the node ($b$) and the axis of minimum rotational stiffness, for vibratory movements relative to the unit shown and in the plane of the drawing, lies close to the nodal point $b$ and is perpendicular to the plane of the drawing. As a result engine vibration relative to the support involves mainly shear distortion of the resilient material and the transmission of such vibrations to the engine support are at a minimum.

By arranging the suspension unit 22, in the Fig. 1 embodiment, so that the major surfaces of the resilient pads are approximately normal to lines extending substantially through the centers of the respective units to the nodal point, substantially all of the forces incident to the particular mode of vibration are transmitted through shear of the resilient material in which direction the material is relatively soft and there are only small components which have to be transmitted through the resilient material in compression in which direction the material is relatively stiff. If the stiffness ratio of compression to shear, as in the embodiment shown in Fig. 1, is of the order of fifty to one a vibratory movement of the engine relative to its support in a direction to cause compression of the material would cause transmission of a force fifty times as great as the same vibratory movement in a direction to cause shear of the material.

With the relatively high stiffness ratio of compression to shear of fifty to one as originally disclosed herein, and with the axis of minimum rotational stiffness located, for best results, exactly at the node, the intersection of the axes of major stiffness (or compression axes) of the several suspension units will intersect on the axis of rotation or thrust axis of the engine at a point slightly displaced outwardly from the node, but passing substantially through the node.

Figure 4:
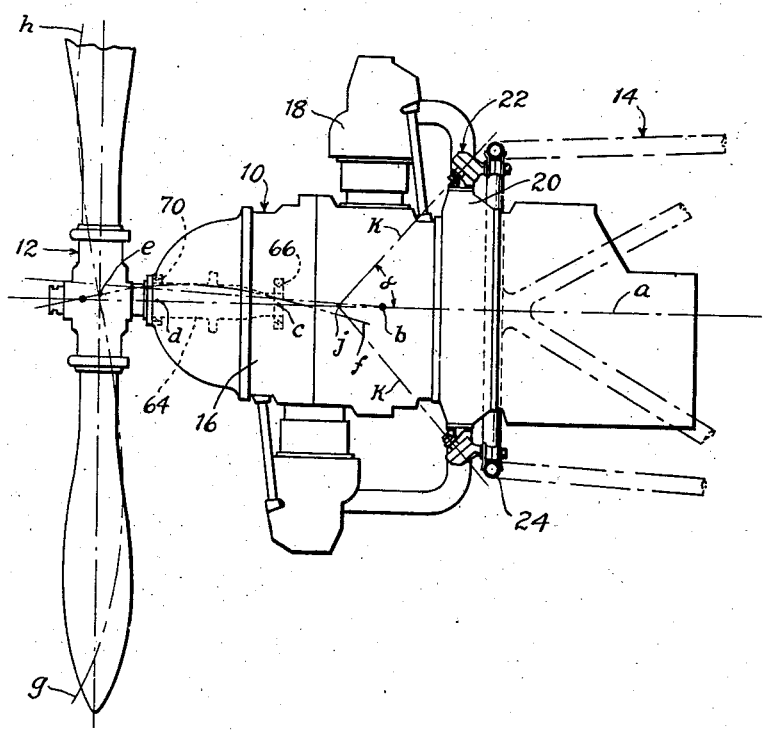
Fig. 4 is a somewhat diagrammatic view similar to Fig. 1, showing the application to the power plant and its support of suspension units having their principal axes intersecting the axis of rotation of the power plant forward of the node of a particular mode of vibration.

In Fig. 4 an aircraft power plant arrangement is shown similar to that described in Fig. 1, but showing suspension units the resilient cushions of which have a lower stiffness ratio of compression to shear of, for example, the order of ten to one.

Figure 2:
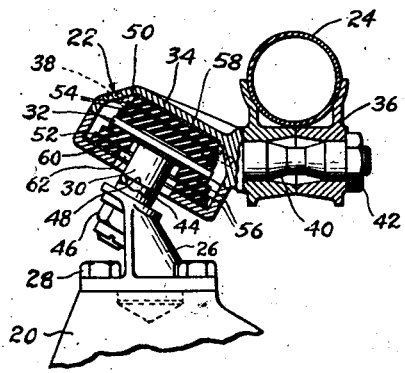
Fig. 2 is a longitudinal sectional view through the suspension unit illustrated in Fig. 1.
Figure 3:
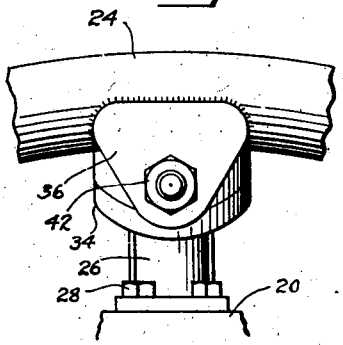
Fig. 3 is an elevational view of the unit shown in section in Fig. 2.

In a suspension system having mounts of the above mentioned lower ratio of stiffness in compression to shear, in order to maintain the axis of minimum rotational stiffness at the nodal point it is necessary to arrange the suspension units so that their principal axes or compression axes intersect the axis of rotation or thrust axis of the engine at a point displaced further outboard from the node as compared with mounts having higher stiffness ratios. For example, in a suspension unit having a stiffness ratio of compression to shear of ten to one, a vibratory movement of the engine relative to its support in a direction to cause compression of the material would cause transmission of a force ten times as great as the same vibratory movement in a direction to cause shear of the material. The rotational stiffness of the engine with respect to its support about any axis perpendicular to the axis of rotation or thrust axis of the engine will involve components of stiffness resulting from shear stiffnesses of the various suspension units multiplied by the square of the radius from the selected axis to the various suspension units and components of stiffness resulting from compression stiffnesses of the various suspension units multiplied by the square of this same radius. It will be evident that when the stiffness ratio is large (when the mount unit has large stiffness in compression relative to stiffness in shear) the axis of minimum rotational stiffness will be located at a point such that the components of stiffness due to compression of the resilient material are small. With such mounting units, the axis of minimum rotational stiffness passes through the thrust axis near the point of intersection of the compression axes, and hence the compression axes should intersect substantially at the node in order that the axis of minimum rotational stiffness may pass through the node. This results in the arrangement shown in Figs. 1-3.

In a suspension where lower stiffness ratio is used, as in Fig. 4, the location of the axis of minimum rotational stiffness also depends on the same three factors, (1) the magnitude of the components of stiffness resulting from shear stiffness of the various suspension units, (2) the magnitude of the components of stiffness resulting from compression stiffnesses of the various suspension units and (3) the length of the radii from the selected axis to the various suspension units. The magnitude of the sum of the components of stiffness resulting from compression stiffnesses of the various suspension units will be a minimum when the selected axis is at the intersection point of the principal axes of the units with the axis of rotation or thrust axis of the engine and will increase rapidly as the selected axis of rotation about which the stiffness is measured is taken farther from this intersection point. However, the radii become shorter as the selected axis is moved toward the plane of suspension (or plane of the mount units) from the intersection of the principal axes with the thrust axis of rotation. Thus, the magnitude of the rotational stiffness about a selected axis, as the axis is moved inboard from the intersection of the compression axes toward the plane of suspension, has a compression component (2) which increases as the selected axis moves away from the intersection of the compression axes; yet as the selected axis approaches the plane of suspension the radii (3) become shorter thus tending to reduce the magnitude of rotational stiffness about the selected axis. The axis of minimum rotational stiffness will therefore be located at the point where the effect of shortening the radii is just balanced by the increasing stiffness resulting from the increases in components of compression stiffnesses. It will be evident that the location of the axis of minimum stiffness will be closer to the plane of support when suspension units of lower stiffness ratio are used when compression stiffness approaches shear stiffness. Conversely, if the axis of minimum rotational stiffness is to be maintained at the node, the intersection of the principal axes with the axis of rotation of the engine must be moved outward away from the plane of suspension as the stiffness ratio is lowered.

In Fig. 4 two principal axes (or compression axes) $k$ are shown for suspension units having a lower stiffness ratio, for example ten to one, intersecting the axis of rotation of the engine at a common point $j$. The distance that the common point of intersection of these lines lies from the node will depend on the stiffness ratio of the resilient cushions of the suspension unit for a given engine suspension system, the location for widely different ratios shown in Figs. 1 and 4 being wholly by way of example.

Thus, by positioning the compression axes of the suspension units relative to their stiffness ratio in the manner indicated above, the axis of minimum rotational stiffness can be maintained at the node $b$ for any desired stiffness ratio for the mount and the transmission of vibrational forces incident to the mode of vibration in which the engine and propeller have wobbling movements of opposite phase at relatively high frequency may be isolated from the aircraft for units having varying stiffness ratios.

If desired friction dampers of the character disclosed in my United States Patent No. 2,317,501, issued April 27, 1943, for Friction damped engine mounts, may be added to the suspension units hereinabove described and illustrated in the accompanying drawings to reduce the amplitude of vibrational movements at low frequencies. While the addition of the friction dampers might be slightly detrimental in an ideal installation, the use of solid or Coulomb friction minimizes the disadvantageous effects at high frequency as explained in my United States Patent No. 2,317,501, referred to above.

While two mechanical embodiments have been hereinabove described and illustrated in the accompanying drawings for the purpose of disclosing the invention, it is to be understood that the invention is not limited to the particular embodiments so illustrated and described but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a flexible suspension system for suspending a power plant, including an engine and a propeller, from a substantially rigid annular support, a plurality of flexible suspension units angularly spaced about said support, each comprising, a support attached portion, an engine attached portion, and resilient pads between said portions resisting relative movement between said portions in the plane of the major surfaces of said pads in shear of the resilient material of said pads and resisting relative movements perpendicular to said major surfaces in compression of the resilient material, said units being so disposed that the center lines of all of said supports perpendicular to the major surfaces of respective resilient pads intersect the rotational axis of said engine at a common point which is a nodal point of vibratory movements of the engine relative to the propeller and is located on the side of the center of gravity of the power plant remote from the propeller, whereby engine movements about said nodal point are resisted only in shear of the material of said resilient pads and the transmission of said engine movements to said support is suppressed.

2. In a flexible suspension system for suspending a power plant including an engine and a propeller from a substantially rigid support, a plurality of flexible suspension units each comprising an engine attached portion, a support attached portion, and flat resilient pads between said portions resisting relative movement between said portions in the planes of the major surfaces of said pads in shear of the resilient material of said pads and resisting relative movements perpendicular to said major surfaces in compression of the resilient material of said pads, said major surfaces being so disposed with respect to said engine and support that a perpendicular passing substantially centrally through said pads and through a nodal point of vibratory movements of said engine relative to said propeller will pass within said engine on the side of the center of gravity of said power plant remote from said propeller.

3. In an engine and propeller combination in which the engine is supported from an engine support and the propeller is supported by the engine and in which relative vibrations of the engine and propeller cause the engine to vibrate about a nodal point between the center of gravity of the engine and propeller combination as a whole and the end of the engine remote from the propeller, means for reducing the forces transmitted to the engine support by permitting vibration of said engine about said nodal point, comprising a series of resilient engine mounts connecting said engine and said support, each mount having a resilient element connecting relatively movable portions of said mount and minimizing the transmission of force in any direction in a single plane by shear of the resilient material, said mounts being arranged around said nodal point so that a line passing through a mount substantially perpendicular to said plane passes through said nodal point.

4. A flexible suspension system for an aircraft powerplant comprising a radial engine and a propeller in which said engine and said propeller vibrate relative to each other in a mode having a nodal point on the side of the center of gravity of said powerplant remote from said propeller, said suspension system comprising, an annular series of attachment means on said engine substantially concentric with the engine axis of rotation, a mount ring also substantially concentric with said axis of rotation, and a plurality of mounting brackets annularly spaced about said mount ring, each bracket including two relatively movable parts attached one to said engine and the other to said mount ring, and flat pads of resilient material between said parts to resilently resist relative movements therebetween, said pads having their flat surfaces normal to a line passing through said pads and through said nodal point, whereby movements of said engine about said nodal point are resisted by said pads entirely in shear of the resilient material thereof.

5. In a flexible suspension system for a powerplant comprising an engine and a propeller, said powerplant having a nodal point of engine-propeller vibration occurring within the engine, a plurality of suspension units each including an engine attached portion, a support attached portion, and a resilient element between said portions, said suspension units being so related to the engine and the support that a principal axis of each of said resilient elements substantially passes through said nodal point, each of said elements being relatively stiff in the direction of its said principal axis and relatively flexible in the direction of at least one axis at right angles to its said principal axis.

6. In a flexible suspension system for a powerplant comprising an engine and a propeller, said powerplant having a nodal point of engine-propeller vibration located within the engine, a plurality of suspension units each including an engine attached portion, a support attached portion, and a resilient element between said portions, said suspension units being so related to the engine and the support that a principal compressive axis of each of said resilient elements passes through the axis of rotation of the engine, each of said resilient elements being relatively stiff in the direction of its principal axis and relatively flexible in the direction of at least one axis at right angles to its said principal axis, said resilient elements being so located that said intersection of said principal axes is located at such a point on the longitudinal axis of said engine that the axis of minimum rotational stiffness passes substantially through said nodal point.

7. In a flexible suspension system for a powerplant comprising an engine and a propeller, said power plant having a nodal point of engine-propeller vibration located within the engine, a plurality of suspension units each including an engine attached portion, a support attached portion, and a resilient element between said portions, said suspension units being so related to the engine and the support that a principal compressive axis of each of said resilient elements passes through the axis of rotation of the engine, each of said resilient elements being relatively stiff in the direction of its principal axis and relatively flexible in the direction of at least one axis at right angles to its said principal axis, said resilient elements being so located that said intersection of said principal axes is located at a point close to said nodal point for elements of high ratio of compression to shear and at points farther outboard therefrom for elements of lower ratio of compression to shear, whereby the axis of minimum rotational stiffness will remain substantially at the nodal point for elements of widely varying stiffness ratios.

JOHN M. TYLER.